US009063657B2

(12) United States Patent
Thompson (10) Patent No.: US 9,063,657 B2
(45) Date of Patent: Jun. 23, 2015

(54) VIRTUAL TAPE SYSTEMS USING PHYSICAL TAPE CACHING

(75) Inventor: James R. Thompson, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 959 days.

(21) Appl. No.: 13/090,189

(22) Filed: Apr. 19, 2011

(65) Prior Publication Data

US 2012/0271993 A1 Oct. 25, 2012

(51) Int. Cl.
*G06F 12/00* (2006.01)
*G06F 13/00* (2006.01)
*G06F 13/28* (2006.01)
*G06F 3/06* (2006.01)
*G06F 11/14* (2006.01)
*G06F 12/08* (2006.01)
*G06F 11/34* (2006.01)

(52) U.S. Cl.
CPC .......... *G06F 3/0608* (2013.01); *G06F 11/3485* (2013.01); *G06F 11/1453* (2013.01); *G06F 11/1456* (2013.01); *G06F 11/3409* (2013.01); *G06F 2201/81* (2013.01); *G06F 12/0868* (2013.01); *G06F 2212/213* (2013.01); *G06F 2212/224* (2013.01); *G06F 3/0656* (2013.01); *G06F 3/0686* (2013.01)

(58) Field of Classification Search
CPC ... G06F 3/0656; G06F 3/0686; G06F 3/0608; G06F 3/0661; G06F 3/0664; G06F 11/1453; G06F 11/1456; G06F 11/3485; G06F 11/3409; G06F 12/0868; G06F 2201/81; G06F 2212/224; G06F 2212/213
USPC ........................................................ 711/111
See application file for complete search history.

(56) References Cited

U.S. PATENT DOCUMENTS

| 8,504,785 | B1 * | 8/2013 | Clifford et al. ................ 711/162 |
| 2009/0063765 | A1 * | 3/2009 | Kottomtharayil et al. ..... 711/112 |
| 2010/0228916 | A1 * | 9/2010 | Massey et al. ................. 711/115 |

* cited by examiner

*Primary Examiner* — Matthew Bradley
*Assistant Examiner* — Rocio Del Mar Perez-Velez
(74) *Attorney, Agent, or Firm* — Zilka-Kotab, PC (57) ABSTRACT

According to one embodiment, a system includes a virtual tape server coupled to at least one tape library, a library manager in communication with the at least one tape library and the virtual tape server, a memory adapted for acting as logical tape storage and a physical tape drive for processing physical tape media adapted for buffering deduplication operations, logic adapted for receiving a data stream from a host system, logic adapted for sending data from the data stream when the data stream is active to at least one of the memory and the tape drive based on whether at least one of a plurality of conditions is met, and logic adapted for sending previously stored data stream data from the tape drive to the memory when the data stream is inactive during a deduplication operation. Other systems and methods are also described according to more embodiments.

20 Claims, 4 Drawing Sheets

VIRTUAL TAPE SYSTEMS USING PHYSICAL TAPE CACHING

BACKGROUND

The present invention relates to data storage systems, and more particularly, to virtual tape systems that use physical tape caching during deduplication operations.

A virtual tape system (VTS) is a tape management system, such as a special storage device or group of devices and software, which manages data such that the data appears to be stored entirely on tape cartridges when portions of the data may actually be located in faster, more highly available types of storage media, such as hard disk drives (HDDs), Flash memory, etc. Programming for a VTS is sometimes referred to as a virtual tape server, although these terms may be used interchangeably, unless otherwise specifically indicated. A VTS may be used with a hierarchical storage management (HSM) system in which data is moved from one storage tier to another as the data falls through various usage thresholds to slower but less costly forms of storage media. A VTS may also be used as part of a storage area network (SAN) where less-frequently used or archived data may be managed by a single virtual tape server for any number of networked computers.

In prior art VTS's, at least one virtual tape server is coupled to a tape library comprising numerous tape drives and tape cartridges. The virtual tape server is also coupled to one or more direct access storage devices (DASDs), each possibly comprised of numerous interconnected HDDs, Flash memory, or any combination thereof.

The DASD functions as a tape volume cache (TVC) of the VTS subsystem. When using a VTS, the host application writes tape data to virtual drives. The volumes written by the host system are physically stored in the TVC (e.g., a RAID disk buffer) and are called virtual volumes. The storage management software within the VTS copies the virtual volumes in the TVC to the physical cartridges owned by the VTS subsystem. Once a virtual volume is copied or migrated from the TVC to tape, the virtual volume is then called a logical volume. As virtual volumes are copied from the TVC to a tape cartridge (tape), they are copied on the tape end to end, taking up only the space written by the host application. This arrangement maximizes utilization of tape cartridge storage capacity.

The storage management software manages the location of the logical volumes on the physical cartridges, and a user typically has no control over the location of the data. When a logical volume is copied from a physical tape cartridge to the TVC, the process is called recall and the volume becomes a virtual volume again. The host cannot distinguish between physical and virtual volumes, or physical and virtual drives. Thus, the host treats the virtual volumes and virtual drives as actual tape cartridges and drives and all host interaction with tape data in a VTS subsystem is through virtual volumes and virtual tape drives.

BRIEF SUMMARY

According to one embodiment, a method for increasing usage of a virtual storage system includes receiving a data stream from a host system at a controller of a virtual storage system, sending data from the data stream when the data stream is active to at least one of the memory and the tape drive based on whether at least one of a plurality of conditions is met, and sending previously stored data stream data from the tape drive to the memory when the data stream is inactive during a deduplication operation, wherein the virtual storage system includes a memory acting as logical tape storage adapted for buffering deduplication operations and a tape drive for processing physical tape media adapted for buffering deduplication operations.

According to another embodiment, a virtual storage system includes a virtual tape server coupled to at least one tape library, a library manager in communication with the at least one tape library and the virtual tape server, a memory acting as logical tape storage adapted for buffering deduplication operations, a physical tape drive for processing physical tape media adapted for buffering deduplication operations, logic adapted for receiving a data stream from a host system at a controller of a virtual storage system, logic adapted for sending data from the data stream when the data stream is active to at least one of the memory and the tape drive based on whether at least one of a plurality of conditions is met, and logic adapted for sending previously stored data stream data from the tape drive to the memory when the data stream is inactive during a deduplication operation.

According to yet another embodiment, a virtual storage system includes a virtual tape server coupled to at least one tape library, a library manager in communication with the at least one tape library and the virtual tape server, a memory adapted for acting as logical tape storage adapted for buffering deduplication operations, a physical tape drive for processing physical tape media adapted for buffering deduplication operations, logic adapted for receiving a data stream received from a host system, logic adapted for sending data from the data stream when the data stream is active to at least one of the memory and the tape drive based on whether at least one of a plurality of conditions is met, logic adapted for sending previously stored data stream data from the tape drive to the memory when the data stream is inactive during a deduplication operation, logic adapted for determining that at least one of a first plurality of conditions is met prior to sending data from the data stream to at least one of the memory and the tape drive, and logic adapted for determining that at least one of a second plurality of conditions is met during sending data from the data stream to the tape drive, wherein the first plurality of conditions includes: authorization to store the data stream to logical tape storage in the virtual storage system, that utilization of the virtual storage system is greater than a threshold utilization, wherein data from the data stream is stored to physical tape media, that at least one physical tape medium is available to accept the data stream, that an amount of data in the data stream is greater than a maximum amount of data cache, wherein the data stream is stored to physical tape media, that the data stream is a write stream, and that a rate of the data stream is greater than a threshold rate, wherein the data stream is stored to physical tape media, and wherein the second plurality of conditions includes: that an end of a physical tape medium has been reached during storing of data from the data stream, that an effect to other virtual storage system operations of storing data from the data stream to physical tape media is greater than a threshold value, that a priority of a tape library being used to store data is greater than a priority of an idle tape library, that virtual storage system resources across one or more tape libraries are not balanced, and that writing to a physical tape medium has occurred for more than a predetermined amount of time.

Other aspects and embodiments of the present invention will become apparent from the following detailed descrip-

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to one general embodiment, a method for increasing usage of a virtual storage system includes receiving a data stream from a host system at a controller of a virtual storage system, sending data from the data stream when the data stream is active to at least one of the memory and the tape drive based on whether at least one of a plurality of conditions is met, and sending previously stored data stream data from the tape drive to the memory when the data stream is inactive during a deduplication operation, wherein the virtual storage system includes a memory acting as logical tape storage adapted for buffering deduplication operations and a tape drive for processing physical tape media adapted for buffering deduplication operations.

According to another general embodiment, a virtual storage system includes a virtual tape server coupled to at least one tape library, a library manager in communication with the at least one tape library and the virtual tape server, a memory acting as logical tape storage adapted for buffering deduplication operations, a physical tape drive for processing physical tape media adapted for buffering deduplication operations, logic adapted for receiving a data stream from a host system at a controller of a virtual storage system, logic adapted for sending data from the data stream when the data stream is active to at least one of the memory and the tape drive based on whether at least one of a plurality of conditions is met, and logic adapted for sending previously stored data stream data from the tape drive to the memory when the data stream is inactive during a deduplication operation.

According to yet another general embodiment, a virtual storage system includes a virtual tape server coupled to at least one tape library, a library manager in communication with the at least one tape library and the virtual tape server, a memory adapted for acting as logical tape storage adapted for buffering deduplication operations, a physical tape drive for processing physical tape media adapted for buffering deduplication operations, logic adapted for receiving a data stream received from a host system, logic adapted for sending data from the data stream when the data stream is active to at least one of the memory and the tape drive based on whether at least one of a plurality of conditions is met, logic adapted for sending previously stored data stream data from the tape drive to the memory when the data stream is inactive during a deduplication operation, logic adapted for determining that at least one of a first plurality of conditions is met prior to sending data from the data stream to at least one of the memory and the tape drive, and logic adapted for determining that at least one of a second plurality of conditions is met during sending data from the data stream to the tape drive, wherein the first plurality of conditions includes: authorization to store the data stream to logical tape storage in the virtual storage system, that utilization of the virtual storage system is greater than a threshold utilization, wherein data from the data stream is stored to physical tape media, that at least one physical tape medium is available to accept the data stream, that an amount of data in the data stream is greater than a maximum amount of data cache, wherein the data stream is stored to physical tape media, that the data stream is a write stream, and that a rate of the data stream is greater than a threshold rate, wherein the data stream is stored to physical tape media, and wherein the second plurality of conditions includes: that an end of a physical tape medium has been reached during storing of data from the data stream, that an effect to other virtual storage system operations of storing data from the data stream to physical tape media is greater than a threshold value, that a priority of a tape library being used to store data is greater than a priority of an idle tape library, that virtual storage system resources across one or more tape libraries are not balanced, and that writing to a physical tape medium has occurred for more than a predetermined amount of time.

According to one embodiment, physical tape may be used in a virtual tape system as a high speed streaming cache during a backup window. After the backup window is completed, the system may ingest the cached data from the physical tape and store it in deduplication operations. Virtual tape libraries provide access to their resources via virtualized tape drive devices. Each virtual tape drive uses a common disk back-store. Each tape device also shares the resources of the system. Embodiments described herein alleviate the burden on the system by streaming to a physical tape cache whenever appropriate/possible.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a storage area network (SAN), a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the tape management system is referred to herein as a Virtual Tape System (VTS), a VTS is only one example of a tape management system. As would be understood by one of ordinary skill in the art, the present disclosure applies to any tape management system, such as a tape library and virtual tape software, etc.

Figure 1:
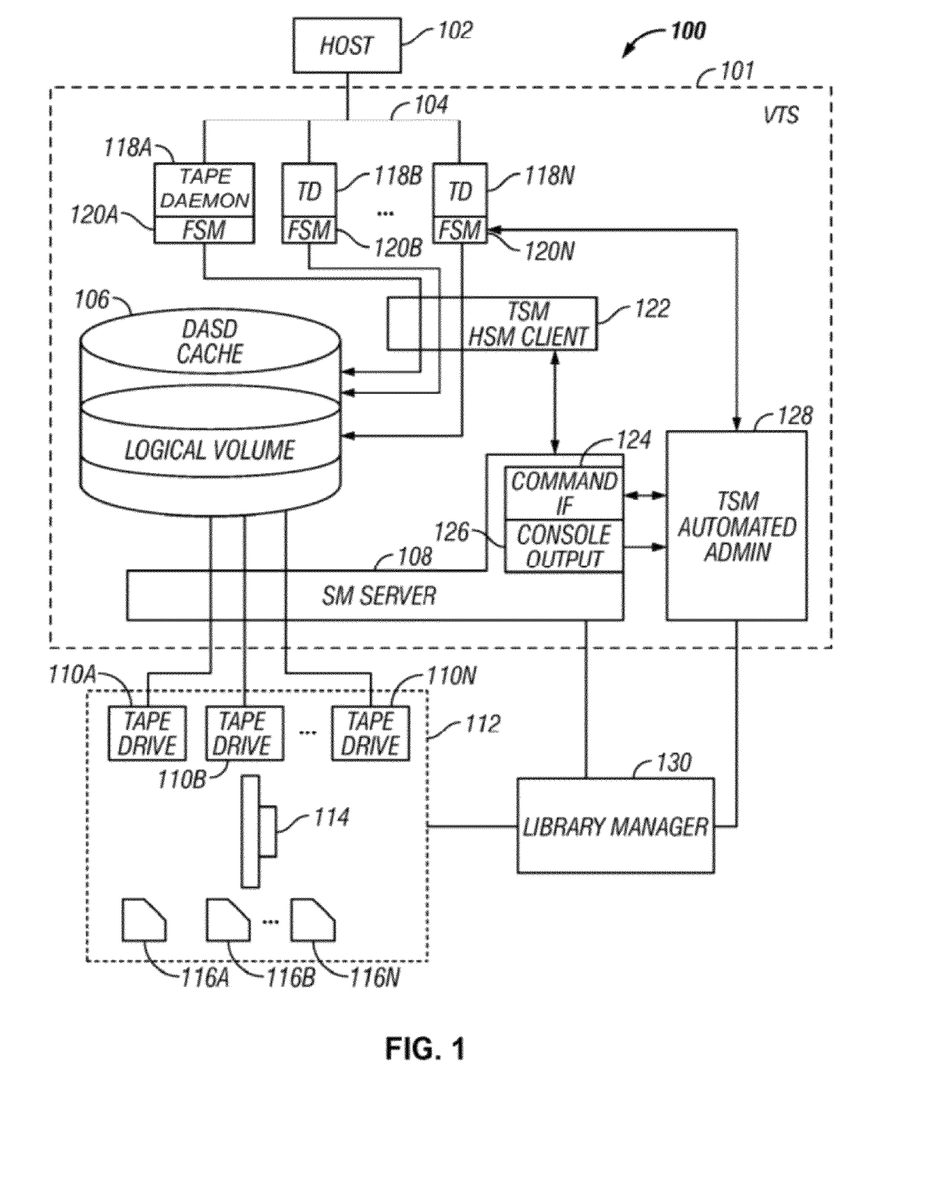
FIG. 1 illustrates a detailed block diagram of a data storage network including a data storage subsystem, according to one embodiment.

With reference now to FIG. 1, there is depicted a block diagram of an exemplary virtual storage system 100 that provides a suitable environment for the practice of the present disclosure. Virtual storage system 100 includes a virtual tape server 101, a tape library 112, and a library manager 130. A host system 102 is linked to the virtual tape server 101 via a network connection, e.g. TCP/IP, LAN, Ethernet, or IBM Enterprise System Connection (ESCON) (not shown). In one embodiment, host system 102 is a computer, such as a personal computer, workstation, or mainframe that is linked to the virtual tape server 101 via an ESCON channel. Virtual tape server 101, in one embodiment, is a computer including a processor, such as a personal computer, workstation, or mainframe and is associated with a Direct Access Storage Device (DASD) cache 106. The DASD cache 106 preferably includes one or more logical volumes. In one embodiment, DASD cache 106 includes a plurality of hard disks that are spaced into redundant array of inexpensive disk (RAID) arrays.

Tape library 112 includes a plurality of tape drives 110, generally designated tape drives 110A, 110B . . . 110N, such as International Business Machine (IBM), TS1100 or Jaguar 3592 tape drives or any other tape drive known in the art. Generally, a removable storage volume, e.g., a tape cartridge 116A, 116B, . . . 116N, is loaded into each of the tape drives. Tape storage drives 110 are serviced by an accessor (e.g., a robot) 114 which transfers selected tape cartridges 116A, 116B, . . . 116N between tape storage drives 110 and their corresponding positions within a tape cartridge repository.

It will be noted that the variable identifier "N" is used in several instances in FIG. 1 to more simply designate the final element (e.g., tape drives, 110A, 110B . . . 110N, and tape cartridges, 116A, 116B, . . . 116N) of a series of related or similar elements (e.g., tape drives and tape cartridges). The repeated use of such variable identifiers is not meant to imply a correlation between the sizes of such series of elements, although such correlation may exist. The use of such variable identifiers does not require that the series of elements has the same number of elements as another series delimited by the same variable identifier. Rather, in each instance of use, the variable identified by "N" may hold the same or a different value than other instances of the same variable identifier.

Tape library 112 typically includes storage management software utilized to monitor the active space on the tape cartridges and schedule reclamations of tape cartridges when the system is less active. In one embodiment, tape library 112 is a tape library system, such as the IBM Virtualization Engine TS 7740 and IBM Magstar 3494 Tape Library. Library manager 130 is utilized in virtual storage system 100 to install, maintain, configure, and operate tape library 112. Within automated library 112, accessor 114 may be controlled utilizing a library manager 130 based upon inputs received from storage management server 108 and/or an automated storage management administrator 128.

DASD cache 106 that includes, in one embodiment, a tape volume cache, provides a cache for data stored in tape library 112. DASD cache 106 maintains logical volumes as logical volume files that are concatenated into physical volume files in the tape cartridges loaded in the tape drives located within tape library 112. When a logical volume file in DASD cache 106 moves to a tape drive in a tape library 112, the logical volume file is written to a physical volume file on a tape cartridge in the actual tape drive. When a physical volume file is recalled for a tape drive and moved to DASD cache 106, the physical volume file then becomes a logical volume file in the DASD cache 106. In this way, DASD cache 106 provides a window to host system 102 of all the physical volume files in tape library 112.

The virtual tape server 101 includes a plurality of virtual tape daemons, generally designated as tape daemons 118A, 118B, . . . 118N, that represent and emulate virtual tape devices to host system 102. The host system 102 operating system, in turn, manages the presentation of the virtual tape devices to the system's users (not shown). Host system 102 views the virtual tape devices as actual drives and when host system 102 attempts to access a logical volume in a selected virtual tape device, the respective virtual tape daemon associated with the virtual tape device requested by the host system 102 will handle the host access request.

Host-to-DASD cache data transfer in the illustrated virtual tape data storage subsystem may be controlled by virtual tape server code via a process such as a hierarchical storage manager (HSM) client 122. For example, a HSM client 122 within virtual storage system 100 may intercept and process the access request from the virtual tape daemons 118A, 118B, . . . 118N. HSM client 122 then carries out host system 102 requests to access the logical volume file on the DASD cache 106. In one embodiment, host-to-DASD cache data transfer may be directly controlled by a file system manager (FSM) 120A, 120B, . . . 120N which handles DASD read and write commands.

Similarly, an interface between the DASD cache 106 and the tape storage drive 110 may be controlled by storage management server 108. For example, if HSM client 122 attempts to mount a logical volume file that is not located in DASD cache 106, HSM client 122 will communicate the access request to the storage manager server 108. If the tape in the access request is already mounted in a tape drive in tape library 112, storage manager server 108 will access the physical volume for the requested logical volume file from the mounted tape. However, if the requested file on a tape is not presently mounted in a tape drive, the storage manage server 108 will initiate a request to library manger 130 to mount the tape containing the physical volume corresponding to the requested logical volume file.

Examples of a storage management processing module which could be used as storage management server 108 and HSM client 122 are the Tivoli Storage Manager (TSM) application and IBM ADSTAR Distributed Storage Manager (ASDM) product, both of which are provided by International Business Machines Corporation of Armonk, N.Y. In data storage network 100, storage management server 108 includes a command interface 124 and a console output 126.

In one embodiment, storage manager server 108 migrates entire logical volume files from DASD cache 106 to tape library 112. When the available space in DASD cache 106 reaches a predetermined level or after a predetermined time period, and automated storage management administrator 128 will direct storage manager server 108 to migrate logical volume files from DASD cache 106 to tape library 112 for archival therein. Typically, automated storage management administrator 128 stores information associated with the physical volumes in an associated volume status table (not shown). According to one embodiment, automated storage management administrator 128 provides functionality needed to achieve the secure data erase process of the present disclosure, and additionally performs many VTS specific administrative functions utilizing storage management server 108. For example, automated storage management administrator 128 may include a secure data erase processing module.

To help ensure that the old version(s) of the VTS volume are handled so that they cannot be recovered, a physical volume that contains invalidated virtual volume data within a certain time interval (e.g., grace period) specified by the customer may be overwritten. Thus, there is introduced a function, implemented by the VTS, and particularly, the automated storage management administrator 128 component of the VTS, for enabling data associated with a virtual or logical volume to be invalidated. A physical volume and its associated data may be secure data erased (e.g., rendered permanently unreadable by any reasonable method) by overwriting all data of the physical volume one or more times utilizing a predetermined file or data pattern (e.g., logical ones, zeroes, some combination thereof). Techniques for the secure data erase process may be user or host-selectable (e.g., based upon a desired level of security) or automatically determined. The overwriting may be performed by one of the tape drives 110A 1108, . . . 110N.

Figure 2A:
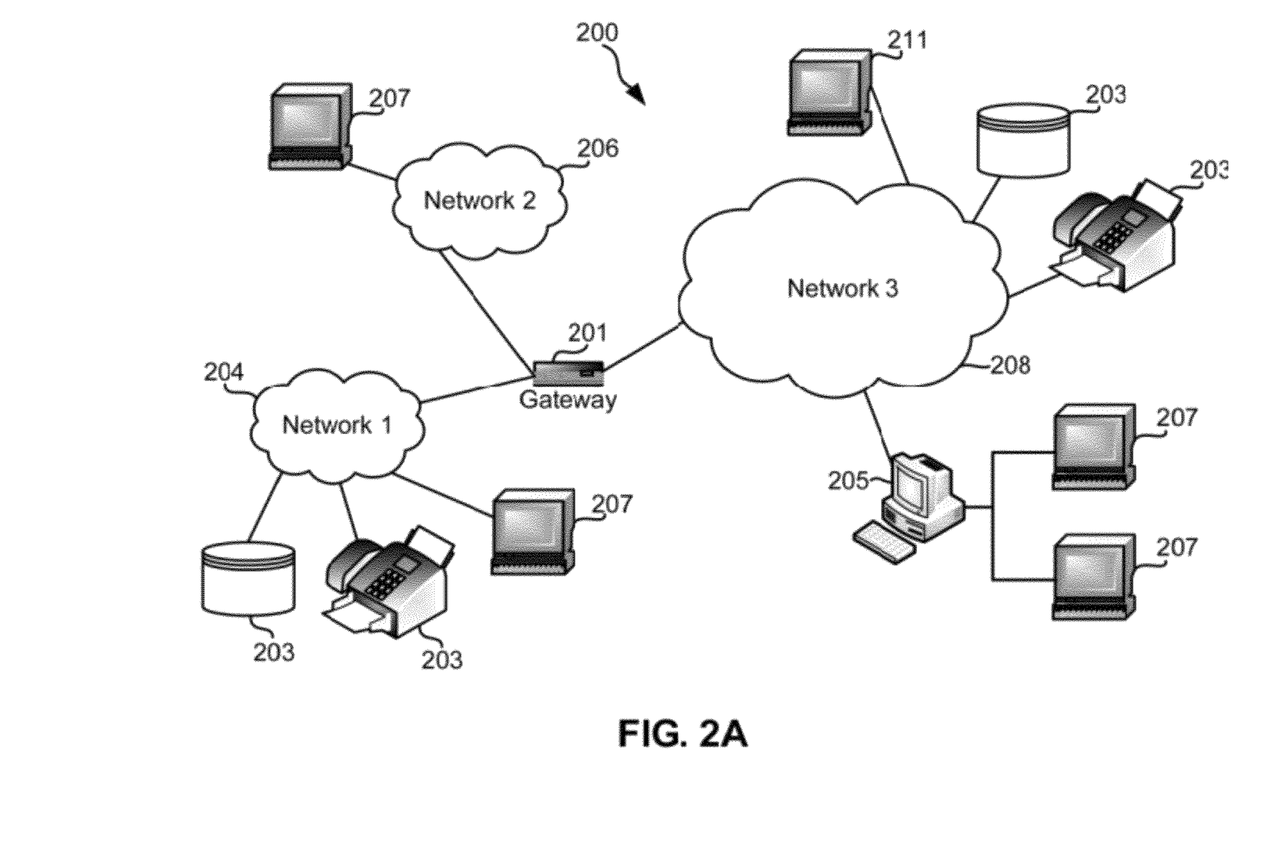
FIG. 2A illustrates a network architecture, in accordance with one embodiment.

FIG. 2A illustrates a network architecture 200, in accordance with one embodiment. As shown in FIG. 2A, a plurality of remote networks 204, 206 are provided including a first remote network 204 and a second remote network 206. A gateway 201 may be coupled between the remote networks 204, 206 and a proximate network 208. In the context of the present network architecture 200, the networks 204, 206, 208 may each take any form including, but not limited to, a LAN, a WAN such as the Internet, a SAN, PSTN, internal telephone network, etc.

In use, the gateway 201 serves as an entrance point from the remote networks 204, 206 to the proximate network 208. As such, the gateway 201 may function as a router, which is capable of directing a given packet of data that arrives at the gateway 201, and a switch, which furnishes the actual path in and out of the gateway 201 for a given packet.

Further included is at least one data server 205 coupled to the proximate network 208, and which is accessible from the remote networks 204, 206 via the gateway 201. It should be noted that the data server(s) 205 may include any type of computing device/groupware. Coupled to each data server 205 is a plurality of user devices 207. Such user devices 207 may include a desktop computer, lap-top computer, hand-held computer, printer or any other type of logic. It should be noted that a user device 211 may also be directly coupled to any of the networks, in one embodiment.

A peripheral 203 or series of peripherals 203, e.g., facsimile machines, printers, networked and/or local storage units or systems, etc., may be coupled to one or more of the networks 204, 206, 208. It should be noted that databases and/or additional components may be utilized with, or integrated into, any type of network element coupled to the networks 204, 206, 208. In the context of the present description, a network element may refer to any component of a network.

Figure 2B:
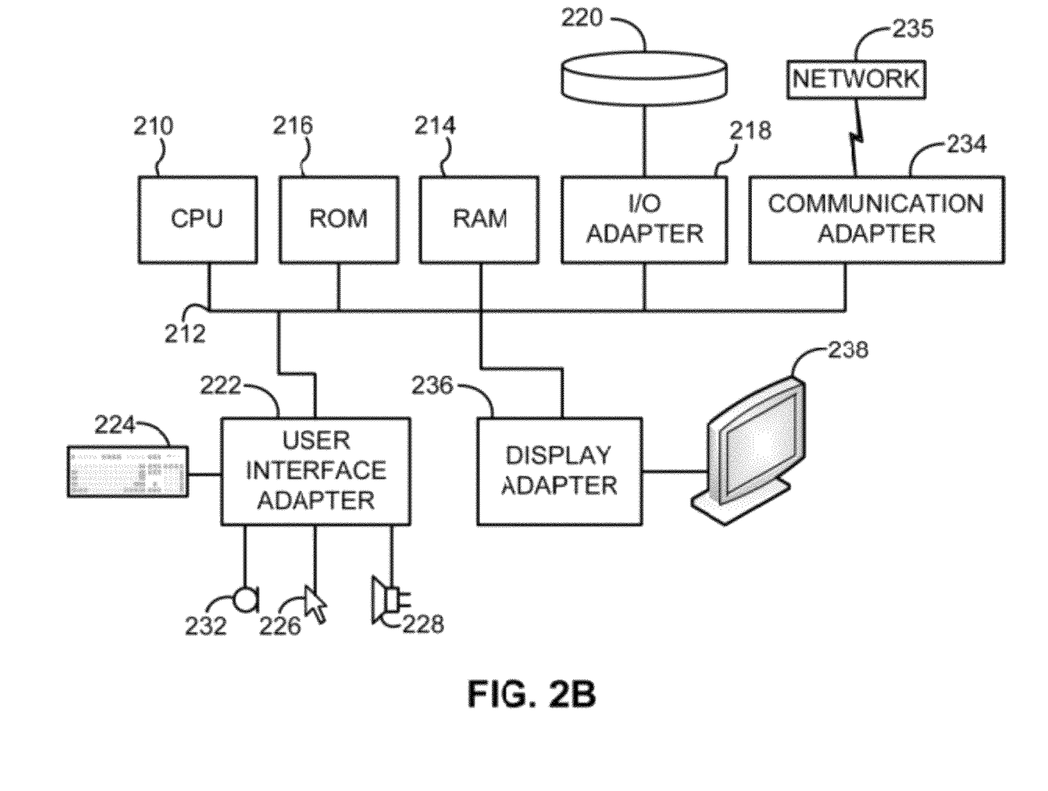
FIG. 2B shows a representative hardware environment that may be associated with the servers and/or clients of FIG. 2A, in accordance with one embodiment.

FIG. 2B shows a representative hardware environment associated with a user device 207 and/or server 205 of FIG. 2A, in accordance with one embodiment. Referring again to FIG. 2B, such figure illustrates a typical hardware configuration of a workstation having a central processing unit 210, such as a microprocessor, and a number of other units interconnected via a system bus 212.

The workstation shown in FIG. 2B includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
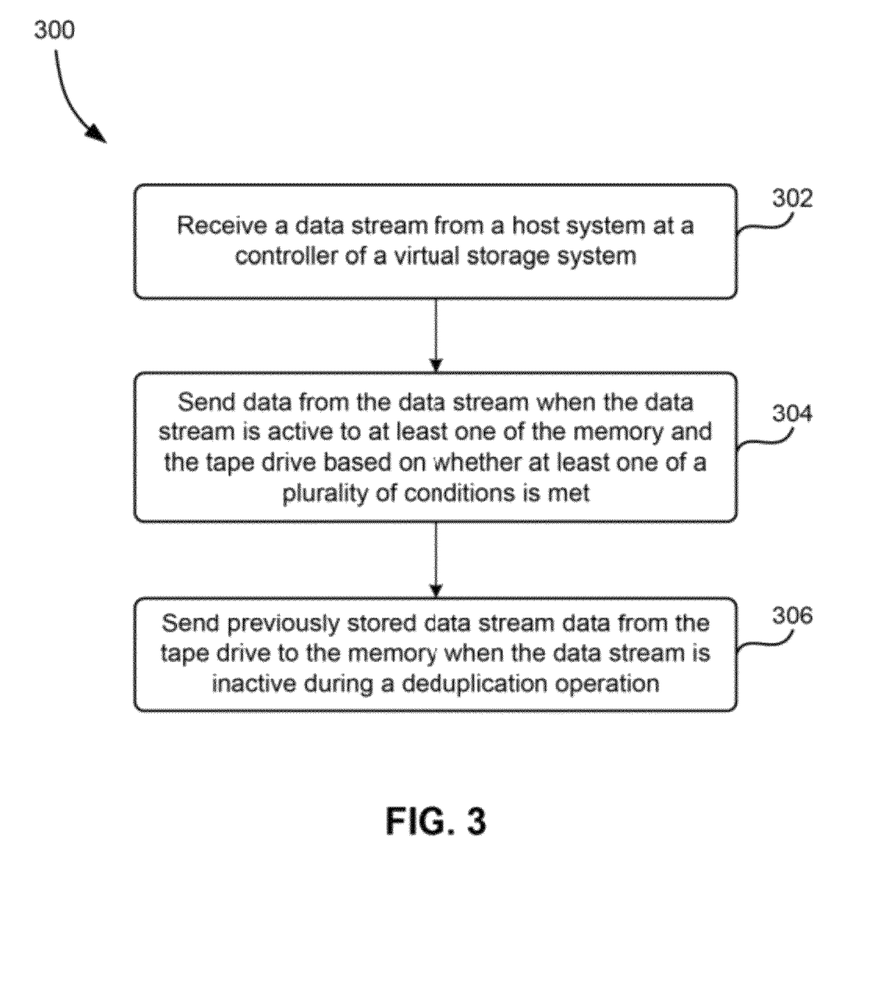
FIG. 3 is a flow diagram of a method, according to one embodiment.

Referring now to FIG. 3, a method 300 for increasing usage of a virtual storage system is shown and according to one embodiment. The method 300 may be used in any desired environment, including but not limited to those shown in FIGS. 1, 2A, and 2B, according to various embodiments. The method 300 may be applied to any virtual storage system, such as a VTS, as described herein according to various embodiments.

In operation 302, a data stream from a host system is received at a controller of a virtual storage system. The controller may be included in any component of the virtual storage system, such as a tape daemon, a file system manager (FSM), a host client, a library manager, etc. In other approaches, the controller may be a separate component of a virtual storage system, such as a VTS, a VTS having physical tape caching, etc.

In one approach, the virtual storage system may include a memory acting as logical tape storage adapted for buffering deduplication operations and a tape drive for processing physical tape media adapted for buffering deduplication operations, among other components.

In operation 304, data from the data stream is sent to at least one of the memory and the tape drive when the data stream is active based on whether at least one of a plurality of conditions is met. Any technique may be used to make this determination, as would be understood by one of skill in the art upon reading the present descriptions.

According to one embodiment, the method 300 may comprise determining that at least one of the plurality of conditions is met prior to sending data from the data stream to at least one of the memory and the tape drive. The plurality of conditions may comprise, but are not limited to: 1) authorization to store the data stream to logical tape storage in the virtual storage system; 2) that utilization of the virtual storage system is greater than a threshold utilization, wherein data from the data stream is stored to physical tape media; 3) that at least one physical tape medium is available to accept the data stream; 4) that an amount of data in the data stream is greater than a maximum amount of data cache, wherein the data stream is stored to physical tape media; 5) that the data stream is a write stream; and 6) that a rate of the data stream is greater than a threshold rate, wherein the data stream is stored to physical tape media.

Each of the above listed conditions serves a function in increasing the usage of a virtual storage system. In particular, these conditions permit checks prior to attempting a data transfer, and can therefore prevent common front-end errors and bottlenecks in data transfer. For example, seeking proper authorization to store data to a particular storage volume ensures that it is determined, e.g., by a system administrator, automatically, etc., whether storage caching is allowed on each volume in the storage system, thereby preventing undesirable loss of data by accidental overwrite.

Furthermore, determining whether utilization of the virtual storage system is greater than a defined threshold enables system administrators to control the direction of data streams so that data is utilized and cached in an efficient manner. Specifically, in one embodiment, system administrators may set a threshold system bandwidth such that whenever the virtual storage system has at least as much available bandwidth as defined in the threshold, data may be more efficiently written to a disk cache rather than to tape cache. Additionally, this ensures that data is only written to tape cache after the system has surpassed its full throughput potential, further ensuring efficient use of available resources.

In addition, in one embodiment, to prevent data loss resulting from faulty or unavailable storage tape cartridge(s), the described approach requires that a tape drive be available with a tape cartridge ready for writing before a data stream will attempt writing to that location. This serves as an additional check for physical or mechanical problems with storage devices and increases system efficiency by ensuring the immediate (or near-immediate) availability of storage media upon request.

Similarly, overall system efficiency and use may be improved, in one embodiment, by ensuring that the system does not send more data to storage than may be processed during an idle time or backup cycle, thereby guaranteeing that the system does not attempt to simultaneously backup data to storage while retrieving data from storage and avoiding potential data loss, corruption, and data inconsistency.

In another embodiment, to prevent the system from attempting to store read data and wasting system resources on unproductive and unwanted activity, an additional condition exists to verify that a data stream to be stored is indeed a write stream. Any method of determining that the data stream is a write stream may be used, as would be understood by one of skill in the art upon reading the present descriptions.

Furthermore, in order to increase the rate at which data streams to storage, a threshold stream rate may be set for each data transfer. Such a threshold confers multiple advantages, including ensuring that data storage proceeds with at least a specified rate therefore providing consistently predictable amounts of data for backup each cycle, and additionally increasing overall streaming efficiency by enabling selection of the fastest among all possible streams for any data stream.

In another embodiment, the method 300 may comprise determining that at least one of the plurality of conditions is met during sending data from the data stream to the tape drive and altering the sending of the data from the data stream to the tape drive based on the at least one of the plurality of conditions being met. In this embodiment, the plurality of conditions may comprise, but is not limited to: 1) that an end of a physical tape medium has been reached during storing of data from the data stream; 2) that an effect to other virtual storage system operations of storing data from the data stream to physical tape media is greater than a threshold value; 3) that a priority of a tape library being used to store data is greater than a priority of an idle tape library; 4) that virtual storage system resources across one or more tape libraries are not balanced; and 5) that writing to a physical tape medium has occurred for more than a predetermined amount of time.

Similarly to the conditions evaluated prior to storing data from the data stream, these conditions evaluated during data storage ensure a back-end check on system performance and reliability.

In one embodiment, determining whether a tape has been exhausted during a particular storage operation enables the system to efficiently determine the appropriate storage volume for a given data stream, and furthermore to prepare an appropriate volume for continued data transfer in a next operation.

Additionally, in one embodiment, operations detrimental to overall virtual storage system performance may be detected, canceled, and potentially avoided by monitoring whenever other storage operations are negatively impacted by a particular storage operation.

In operation 306, previously stored data stream data is sent from the tape drive to the memory when the data stream is inactive during a deduplication operation. Any method may be used to send the data stream data as would be understood by one of skill in the art upon reading the present descriptions.

In a related approach, determining that the at least one of the plurality of conditions is met may be made prior to storing data from the data stream. The data may be stored, e.g., to one or more physical tape media in at least one tape library of the virtual storage system.

A virtual storage system may be employed to facilitate execution of method 300, in one embodiment. Of course, any system, device, logic, etc., may be used to carry out method 300, according to various embodiments.

In one such embodiment, a virtual storage system may include a virtual tape server coupled to at least one tape library, a library manager in communication with the at least one tape library and the virtual tape server, a memory acting as logical tape storage adapted for buffering deduplication operations, a physical tape drive for processing physical tape media adapted for buffering deduplication operations, logic adapted for receiving a data stream from a host system at a controller of a virtual storage system, logic adapted for sending data from the data stream when the data stream is active to at least one of the memory and the tape drive based on whether at least one of a plurality of conditions is met, and logic adapted for sending previously stored data stream data from the tape drive to the memory when the data stream is inactive during a deduplication operation.

In a further embodiment, the plurality of conditions may include any or all of the following: authorization to store the data stream to logical tape storage in the virtual storage system, that utilization of the virtual storage system is greater than a threshold utilization, wherein data from the data stream is stored to physical tape media, that at least one physical tape medium is available to accept the data stream, that an amount of data in the data stream is greater than a maximum amount of data cache, wherein the data stream is stored to physical tape media, that the data stream is a write stream, and that a rate of the data stream is greater than a threshold rate, wherein the data stream is stored to physical tape media.

In another embodiment, the system may include additional logic adapted for determining that at least one of a second plurality of conditions is met during sending data from the data stream to the tape drive, in which case the second plurality of conditions may include any or all of the following: that an end of a physical tape medium has been reached during storing of data from the data stream, that an effect to other virtual storage system operations of storing data from the data stream to physical tape media is greater than a threshold value, that a priority of a tape library being used to store data is greater than a priority of an idle tape library, that virtual storage system resources across one or more tape libraries are not balanced, and that writing to a physical tape medium has occurred for more than a predetermined amount of time.

According to another embodiment, a virtual storage system includes a virtual tape server coupled to at least one tape library, a library manager in communication with the at least one tape library and the virtual tape server, a memory adapted for acting as logical tape storage adapted for buffering deduplication operations, a physical tape drive for processing physical tape media adapted for buffering deduplication operations, logic adapted for receiving a data stream received from a host system, logic adapted for sending data from the data stream when the data stream is active to at least one of the memory and the tape drive based on whether at least one of a plurality of conditions is met, logic adapted for sending previously stored data stream data from the tape drive to the memory when the data stream is inactive during a deduplication operation, logic adapted for determining that at least one of a first plurality of conditions is met prior to sending data from the data stream to at least one of the memory and the tape drive, and logic adapted for determining that at least one of a second plurality of conditions is met during sending data from the data stream to the tape drive, wherein the first plurality of conditions includes: authorization to store the data stream to logical tape storage in the virtual storage system, that utilization of the virtual storage system is greater than a threshold utilization, wherein data from the data stream is stored to physical tape media, that at least one physical tape medium is available to accept the data stream, that an amount of data in the data stream is greater than a maximum amount of data cache, wherein the data stream is stored to physical tape media, that the data stream is a write stream, and that a rate of the data stream is greater than a threshold rate, wherein the data stream is stored to physical tape media, and wherein the second plurality of conditions includes: that an end of a physical tape medium has been reached during storing of data from the data stream, that an effect to other virtual storage system operations of storing data from the data stream to physical tape media is greater than a threshold value, that a priority of a tape library being used to store data is greater than a priority of an idle tape library, that virtual storage system resources across one or more tape libraries are not balanced, and that writing to a physical tape medium has occurred for more than a predetermined amount of time.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:
1. A method for increasing usage of a virtual storage system, the method comprising:
receiving a data stream from a host system at a controller of a virtual storage system, wherein the virtual storage system comprises:
a memory acting as logical tape storage, the memory adapted for buffering deduplication operations; and a tape drive for processing physical tape media, the tape drive adapted for buffering deduplication operations;

prior to sending data from the data stream to at least one of the memory and the tape drive, determining that an amount of data in the data stream is greater than a maximum amount of data cache;

in response to determining that the amount of data in the data stream is greater than the maximum amount of data cache, sending the data from the data stream when the data stream is active to the tape drive; and sending previously stored data stream data from the tape drive to the memory when the data stream is inactive during a deduplication operation.

2. The method as recited in claim 1, further comprising determining that at least one of a plurality of conditions is met prior to sending the data from the data stream to the at least one of the memory and the tape drive, wherein the plurality of conditions comprises:

authorization to store the data stream to logical tape storage in the virtual storage system;

that utilization of the virtual storage system is greater than a threshold utilization, wherein data from the data stream is stored to physical tape media;

that at least one physical tape medium is available to accept the data stream;

that the data stream is a write stream; and that a rate of the data stream is greater than a threshold rate, wherein the data stream is stored to physical tape media.

3. The method as recited in claim 1, further comprising determining that at least one of a plurality of conditions is met during sending data from the data stream to the tape drive, and wherein the plurality of conditions comprises:

that an end of a physical tape medium has been reached during storing of data from the data stream;

that an effect to other virtual storage system operations of storing data from the data stream to physical tape media is greater than a threshold value;

that a priority of a tape library being used to store data is greater than a priority of an idle tape library;

that virtual storage system resources across one or more tape libraries are not balanced; and that writing to a physical tape medium has occurred for more than a predetermined amount of time, and further comprising altering the sending of the data from the data stream to the tape drive based on the at least one of the plurality of conditions being met.

4. The method as recited in claim 1, further comprising:

determining that at least one of a first plurality of conditions is met prior to sending data from the data stream, wherein the first plurality of conditions comprises:

authorization to store the data stream to logical tape storage in the virtual storage system;

that utilization of the virtual storage system is greater than a threshold utilization, wherein data from the data stream is stored to physical tape media;

that the data stream is a write stream; and that a rate of the data stream is greater than a threshold rate, wherein the data stream is stored to physical tape media; and determining that at least one of a second plurality of conditions is met during sending of data from the data stream to the tape drive, wherein the second plurality of conditions comprises:

that an end of a physical tape medium has been reached during storing of data from the data stream;

that an effect to other virtual storage system operations of storing data from the data stream to physical tape media is greater than a threshold value;

that a priority of a tape library being used to store data is greater than a priority of an idle tape library;

that virtual storage system resources across one or more tape libraries are not balanced; and that writing to a physical tape medium has occurred for more than a predetermined amount of time.

5. A virtual storage system, comprising:

a virtual tape server coupled to at least one tape library;

a library manager in communication with the at least one tape library and the virtual tape server;

a memory acting as logical tape storage, the memory being configured to buffer deduplication operations;

a tape drive for processing physical tape media, the tape drive being configured to buffer deduplication operations;

logic configured to receive a data stream from a host system;

logic configured to determine that an amount of data in the data stream is greater than a maximum amount of data cache;

logic configured to send data from the data stream when the data stream is active to at least one of the memory and the tape drive based on whether at least one of a plurality of conditions is met; and logic configured to send previously stored data stream data from the tape drive to the memory when the data stream is inactive during a deduplication operation.

6. The system as recited in claim 5, wherein the plurality of conditions comprises authorization to store the data stream to logical tape storage in the virtual storage system.

7. The system as recited in claim 5, wherein the plurality of conditions comprises that utilization of the virtual storage system is greater than a threshold utilization, wherein data from the data stream is stored to physical tape media.

8. The system as recited in claim 5, wherein the plurality of conditions comprises that at least one physical tape medium is available to accept the data stream.

9. The system as recited in claim 5, wherein the plurality of conditions comprises that an amount of data in the data stream is greater than a maximum amount of data cache, wherein the data stream is stored to physical tape media.

10. The system as recited in claim 5, wherein the plurality of conditions comprises that the data stream is a write stream.

11. The system as recited in claim 5, wherein the plurality of conditions comprises that a rate of the data stream is greater than a threshold rate, wherein the data stream is stored to physical tape media.

12. The system as recited in claim 5, wherein the plurality of conditions comprises:

authorization to store the data stream to logical tape storage in the virtual storage system;

that utilization of the virtual storage system is greater than a threshold utilization, wherein data from the data stream is stored to physical tape media;

that at least one physical tape medium is available to accept the data stream;

that an amount of data in the data stream is greater than a maximum amount of data cache, wherein the data stream is stored to physical tape media;

that the data stream is a write stream; and that a rate of the data stream is greater than a threshold rate, wherein the data stream is stored to physical tape media.

13. The system as recited in claim 5, further comprising logic adapted for determining that at least one of a second plurality of conditions is met during sending data from the data stream to the tape drive.

14. The system as recited in claim 13, wherein the second plurality of conditions comprises that an end of a physical tape medium has been reached during storing of data from the data stream.

15. The system as recited in claim 13, wherein the second plurality of conditions comprises that an effect to other virtual storage system operations of storing data from the data stream to physical tape media is greater than a threshold value.

16. The system as recited in claim 13, wherein the second plurality of conditions comprises that a priority of a tape library being used to store data is greater than a priority of an idle tape library.

17. The system as recited in claim 13, wherein the second plurality of conditions comprises that virtual storage system resources across one or more tape libraries are not balanced.

18. The system as recited in claim 13, wherein the second plurality of conditions comprises that writing to a physical tape medium has occurred for more than a predetermined amount of time.

19. The system as recited in claim 13, wherein the second plurality of conditions comprises:
   that an end of a physical tape medium has been reached during storing of data from the data stream;
   that an effect to other virtual storage system operations of storing data from the data stream to physical tape media is greater than a threshold value;
   that a priority of a tape library being used to store data is greater than a priority of an idle tape library;
   that virtual storage system resources across one or more tape libraries are not balanced; and
   that writing to a physical tape medium has occurred for more than a predetermined amount of time.

20. A virtual storage system, comprising:
   a virtual tape server coupled to at least one tape library;
   a library manager in communication with the at least one tape library and the virtual tape server;
   a memory adapted for acting as logical tape storage, the memory adapted for buffering deduplication operations;
   a physical tape drive for processing physical tape media, the physical tape drive adapted for buffering deduplication operations;
   logic adapted for receiving a data stream from a host system;
   logic adapted for sending data from the data stream when the data stream is active to at least one of the memory and the tape drive based on whether at least one of a plurality of conditions is met;
      logic adapted for sending previously stored data stream data from the tape drive to the memory when the data stream is inactive during a deduplication operation; and
      logic adapted for determining that at least one of a first plurality of conditions is met prior to sending data from the data stream to at least one of the memory and the tape drive, and wherein the first plurality of conditions comprises:
         authorization to store the data stream to logical tape storage in the virtual storage system;
         that utilization of the virtual storage system is greater than a threshold utilization, wherein data from the data stream is stored to physical tape media;
         that at least one physical tape medium is available to accept the data stream;
         that an amount of data in the data stream is greater than a maximum amount of data cache, wherein the data stream is stored to physical tape media;
         that the data stream is a write stream; and
         that a rate of the data stream is greater than a threshold rate, wherein the data stream is stored to physical tape media; and
      logic adapted for determining that at least one of a second plurality of conditions is met during sending data from the data stream to the tape drive, wherein the second plurality of conditions comprises:
         that an end of a physical tape medium has been reached during storing of data from the data stream;
         that an effect to other virtual storage system operations of storing data from the data stream to physical tape media is greater than a threshold value;
         that a priority of a tape library being used to store data is greater than a priority of an idle tape library;
         that virtual storage system resources across one or more tape libraries are not balanced; and
         that writing to a physical tape medium has occurred for more than a predetermined amount of time.

* * * * *